(12) United States Patent
Espiard et al.

(10) Patent No.: US 6,395,819 B1
(45) Date of Patent: May 28, 2002

(54) INSULATION PRODUCT, ESPECIALLY THERMAL INSULATION PRODUCT, AND ITS MANUFACTURING PROCESS

(75) Inventors: Philippe Espiard, Gouvieux; Bruno Mahieuxe, Neuilly sous Clermont; Serge Tetart, Saint-Maximin; Jean-Louis Mallier, Laigneville, all of (FR)

(73) Assignee: Saint-Gobain Isover, Courbevoie (FR)

( * ) Notice: Subject to any disclaimer, the term of this patent is extended or adjusted under 35 U.S.C. 154(b) by 0 days.

(21) Appl. No.: 09/597,411

(22) Filed: Jun. 19, 2000

(51) Int. Cl.⁷ .................................................. C08K 3/34
(52) U.S. Cl. ........................ 524/492; 524/494; 524/594
(58) Field of Search ................................ 524/492, 494, 524/594

(56) References Cited

U.S. PATENT DOCUMENTS 4,172,042 A  * 10/1979 Kiisler et al. .................. 252/62

* cited by examiner

*Primary Examiner*—Kriellion A. Sanders
(74) *Attorney, Agent, or Firm*—Oblon, Spivak, McClelland, Maier & Neustadt, P.C.

(57) ABSTRACT

A sizing composition which is a phenol-formaldehyde resin substantially free of urea or of a urea derivative and which has reduced emissions of isocyanates upon heating. Insulation products based on mineral wool, especially glass wool or rock wool, which are suitable for mass-produced thermal appliances and contain the sizing composition have reduced organic emissions during manufacturing and when used in thermal appliances.

40 Claims, No Drawings

INSULATION PRODUCT, ESPECIALLY THERMAL INSULATION PRODUCT, AND ITS MANUFACTURING PROCESS

BACKGROUND OF THE INVENTION

1. Field of the Invention

The present invention relates to thermal or acoustic insulation products based on mineral wool, especially glass wool or rock wool, and on an organic binder based on formaldehyde-derived condensates used in these insulation products. Specifically, the present invention relates to an insulation product and a binder or sizing composition used therein which emits a reduced amount of volatile organic compounds, and to a manufacturing process for producing the insulation product.

2. Discussion of the Background

Products based on mineral wool are made by a multi-step process in which the wool itself is made by, for example, the technique known as centrifugal drawing, in which a molten mineral material is converted into filaments, and then the filaments are drawn and entrained by a high-temperature high-speed gas stream, thereby forming a sheet of the filaments in a receiving member. In order to ensure the cohesion of the sheet, a sizing composition containing a thermosetting sizing resin is sprayed onto the mineral wool (i.e., the filaments of the mineral material) as it travels towards the receiving member. The sheet thus treated is then subjected to a heat treatment in an oven in order to polycondense the sizing resin and thereby obtain a product having the desired properties, such as dimensional stability, tensile strength, thickness recovery after compression, and homogeneous color.

The sizing compositions which are sprayed onto the mineral wool, are generally aqueous compositions containing a phenol-formaldehyde resin and additives such as a catalyst for curing the resin, a silane adhesion promoter, antidusting mineral oils, etc. The ability of these compositions to be applied by sprayed is determined by the "dilutability" of the resin—that is, how well the resin can be diluted in water. The dilutability of the sizing resin is defined as the maximum degree of dilution of the sizing resin with room temperature water (room temperature is about 15 to 25° C., generally around 20° C.), for which no permanent turbidity of the diluted solution is observed. Preferably, a resin intended to be used in a sizing composition may be diluted on the order of at least 1000% at 20° C. (i.e., 10 ml of resin diluted with 100 ml of water or more, without the mixture becoming turbid). Consequently, it is common practice to limit the degree of condensation of the formaldehyde and phenol, in order to avoid the formation of long polymer chains which are not very hydrophilic and which would reduce the dilutability of the sizing resin. Sizing resins produced in this manner contain unreacted monomers, in particular formaldehyde. Because of its volatility, unreacted formaldehyde or other volatile monomers may produce undesirable emissions of organic compounds into the atmosphere.

Because of this problem, phenol-formaldehyde resins used in sizing compositions are generally treated with urea, which reacts with the free formaldehyde to form non-volatile condensation products. Furthermore, the presence of urea in the resin is economically advantageous because urea is inexpensive and may be introduced in relatively large quantities without appreciably affecting the service properties of the resin, especially the mechanical properties of the final product. This can significantly reduce the total cost of the resin. See, for example, EP-A-148,050.

However, this solution to the problem of volatile formaldehyde emission from sizing resins is not entirely satisfactory with regard to atmospheric pollution since the urea-formaldehyde condensation products are not very heat stable. When such resins are used in the sizing of mineral wool, the resin is exposed to temperatures of greater than 100° C. At such temperatures, the urea-formaldehyde condensation product generates urea, formaldehyde and ammonia gas, which are then released into the atmosphere of the factory.

Because of this problem, attempts have been made either to modify the urea-formaldehyde condensates chemically, in order to make them thermally more stable, or to reduce the proportion of urea-formaldehyde condensates in the resin. See, for example, EP-A-480,778. However, in each case, considerable amounts of the urea were nevertheless used in the resin in order to reduce the cost of the resin.

Although such modified sizing resins reduce the emission of undesirable organic compounds into a factory's atmosphere during manufacture of the insulation product, environmental standards are becoming increasingly more stringent. It is therefore always desirable to lower the level of emissions even further, particularly for insulation products exposed to high temperatures, and especially in the case of insulation products used in mass-produced thermal appliances, such as stoves and ovens.

The mineral wool based insulation products of the present invention are intended to minimize the of emission of pollutants, both during manufacturing and during use of the product by the end user. In the course of achieving this objective, the present inventors found that the presence of certain nitrogen compounds in the sizing resin may lead, at high temperature, to the emission of isocyanates, a type of pollutant that has hitherto not been recognized. The present inventors have identified urea as the foremost of these nitrogen compounds which can cause the emission of isocyanate pollutants. For example, when an insulation product containing a phenol-formaldehyde resin containing urea is heated to a high temperature, i.e., about 350° C., the emissions of at least one isocyanate, particularly methyl isocyanate, are approximately proportional to the amount of urea present in the sizing composition, and therefore in the insulation product.

SUMMARY OF THE INVENTION

The present invention is an insulation product based on mineral wool, especially glass wool or rock wool, containing a sizing resin based on a phenol-formaldehyde resin which is substantially free of urea or of a urea derivative, and in addition, the corresponding sizing composition.

DETAILED DESCRIPTION OF THE INVENTION

The term "urea derivative" means any product liable to be formed by the reaction of urea with at least one of the compounds in the resin. In particular, a sizing resin used in the manufacture of an insulation product according to the present invention contains no, or substantially no urea, nor a urea-formaldehyde condensation product.

To a lesser degree, ammonia, defined herewith as either ammonia or ammonium salts, may also be a source of isocyanate under certain conditions. In a preferred embodiment, the insulation product according to the present invention is substantially free of ammonia.

The expression "substantially free" means that only a minor amount of the specified compound, is present. An insulation which is substantially free of ammonia contains only minor amounts of ammonia, so that only insignificant amounts of the corresponding isocyanate emission can be measured. Alternatively, the amount of ammonia remains below an environmentally acceptable level, which level may vary depending on the use to which the product is put.

It is usually difficult to estimate the content of certain organic constituents of the insulation product as it leaves the manufacturing line in the finished state. Even though the amount of material used in each of the manufacturing steps may be precisely known, material may be lost into the atmosphere by evaporation or condensation, etc. during manufacturing, or subject to other sources of variability so that the final amount of a particular constituent may vary from one product to another during the same manufacturing run. By way of illustration, it may be estimated that an insulation product according to the present invention contains, on average, preferably at most 0.004%, more preferably 0.002%, by weight of urea or of a urea derivative, and in a most preferred embodiment the product contains no urea or urea derivative. Preferably, an insulation product according to the invention contains at most 0.2% by weight of ammonia solution, more preferably less than 0.1%, and most preferably less than 0.01% by weight of ammonia solution.

The sizing composition according to the present invention may be more easily characterized. Such a composition contains phenol-formaldehyde resin which is substantially free of urea or of a urea derivative. Preferably, the urea content is equal to zero, but it is always possible that a minute amount of urea is introduced as an impurity by another organic constituent of the composition. The urea content is therefore preferably at most 0.1 parts by weight of urea or of a urea derivative per 100 parts by weight of dry resin.

In a preferred embodiment, the sizing composition is also substantially free of ammonia. The ammonia is generally introduced into a sizing composition in the form of an aqueous solution with an ammonia concentration of about 20% by weight. The proportion of ammonia solution in a sizing composition according to the present invention is preferably at most 25 parts by weight of solution, more preferably approximately 18 to 20 parts by weight or less, per 100 parts by weight of dry resin. The amount of ammonia retained in the sizing composition may be regarded as minute because the process for manufacturing the insulation involves the evaporation of ammonia from the sizing composition so that very little ammonia residue remains in the final product.

Preferably, the phenol-formaldehyde resin used in the insulation product or the sizing composition, respectively, is prepared by condensing phenol and formaldehyde in a formaldehyde/phenol molar ratio of about 2 to 6, in water, in the presence of a basic catalyst, especially sodium hydroxide, potassium hydroxide, lime or baryta. The resulting solution preferably has a free formaldehyde content of less than or equal to 25% (by weight with respect to the weight of dry resin) and a free phenol content of preferably less than or equal to 3% (by weight with respect to the weight of dry resin).

The excess phenol with respect to formaldehyde allows the condensation reaction to be shifted in the direction of the formation of phenol-formaldehyde condensates with a limited final free phenol content of less than or equal to 3%, preferably 2.5% and more preferably 1.5%, or less.

A low free formaldehyde content of less than or equal to 20%, preferably 15% and more preferably 10%, may be obtained in various ways. For example, the resin may be prepared under conditions in which the final free formaldehyde is scavenged by an added reactant, or alternatively, by adapting the condensation conditions to limit the final free formaldehyde content after the condensation step.

In a first embodiment of the invention, the phenol-formaldehyde resin used in the sizing composition according to the invention comprises a resol treated with at least one formaldehyde-scavenging reactant chosen from a water-soluble sulphite or bisulphite, or an amine which can react with formaldehyde by a Mannich type reaction mechanism, or mixtures thereof. In this case, the resol is preferably obtained by the reaction of phenol and formaldehyde in a formaldehyde/phenol molar ratio of about 2 to 6, especially 2 to 5 and particularly 2.2 to 4, at a temperature between 50° C. and 80° C., especially between 60° C. and 75° C. and in particular approximately 70° C., for a time which may range up to 90, 150 or even 200 minutes. These conditions generally result in a degree of conversion of the phenol of at least 98%, a dilutability of the resol at 20° C. and at approximately pH 9 of at least approximately 1000% and even more preferably at least approximately 2000%.

The formaldehyde-scavenging water-soluble sulphite or bisulphite may be a sulphite or bisulphite of an alkali metal, especially sodium, or of an alkaline-earth metal, especially calcium, or an ammonium bisulphite. Although ammonium sulphite or bisulphite introduces ammonium ions into the sizing composition, ammonium sulphite or bisulphite are preferred because when products containing these compounds are heated in an oven, ammonia evaporates, leaving no nitrogen compound in the final product. A bisulphite precursor, such as a metabisulphite or other such precursor, or else a mixture of a sulphite and an acidifying agent may also be used.

The bisulphite is very effective as a formaldehyde scavenger since it reacts irreversibly with the formaldehyde, in contrast to urea which reacts reversibly with formaldehyde. Accordingly, products prepared with a sizing composition using a bisulphite formaldehyde scavenger appreciably reduce the risks of formaldehyde emission during the manufacture of the product and during its use.

U.S. Pat. No. 5,578,371 describes the use of bisulphite as a formaldehyde scavenger in a binder for a glass fiber. However, this patent teaches that bisulphite should be used in addition to urea in phenol-formaldehyde resins, because only when an excess amount of urea is used, do harmful emissions of ammonia and of "blue smoke" result. U.S. Pat, No. 5,578,371 makes no mention of the possible generation of isocyanates.

The useful amount of sulphite or bisulphite according to the present invention is preferably about 0.1 to 20 parts by weight per 100 parts by weight of dry resin, especially about 0.1 to 5 parts. In addition, the amount of sulphite or bisulphite may be 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, or 19 parts by weight per 100 parts by weight of dry resin, inclusive of all values and subranges therebetween. The sulphite or bisulphite may be added to a phenol-formaldehyde resin during storage, before formulating the resin into a sizing composition, or else may be added only while formulating the sizing composition.

The amine formaldehyde scavenger capable of reacting by the Mannich reaction mechanism is preferably an alkanolamine, especially monoethanolamine (MEA) or diethanolamine (DEA), or an amine acid, especially aspartic acid, or a cyclic amine, such as piperidine, piperazine or morpholine.

In the Mannich reaction, an aldehyde reacts with an organic compound containing an active hydrogen atom and an amine, in order to form a condensation product called a Mannich base. In the present invention, the aldehyde is the free formaldehyde in the resin and the organic compound containing an active hydrogen is the free phenol in the resin. The formaldehyde-phenol-amine Mannich condensation products are thermally very stable and do not evolve formaldehyde or phenol.

EP-A-480,778 describes using the Mannich reaction to prepare a phenol-formaldehyde resin binder for mineral fibers. However, in EP-A-480,778, urea is used to reduce the amount of free formaldehyde in the phenol-formaldehyde resin. In addition, EP-A-480,778 does not recognize that isocyanates may be generated under high-temperature conditions.

The useful amount of amine according to the present invention is advantageously about 0.1 to 50 parts by weight per 100 parts by weight of dry resin, especially about 0.1 to 25 parts. The amount of amine employed may also be 0.2, 0.3, 0.4, 0.5, 0.6, 0.7, 0.8, 0.9, 1, 2, 3, 4, 5, 6, 7, 8, 9, 10, 15, 20, 25, 30, 35, 40, or 45 parts by weight per 100 parts by weight of dry resin, inclusive of all values and subranges therebetween.

The amine may be added to stored phenol-formaldehyde resin, prior to formulating the sizing composition, or else may be added only while formulating the sizing composition. It may also be used during the synthesis of the resin, before and/or during the condensation reaction.

In a second embodiment of the invention, the phenol-formaldehyde resin used in the composition of the insulation product or the sizing composition, respectively, is based on a supercondensed resol or on the neutralized product of such a resol.

The term "supercondensed resol" means a phenol-formaldehyde resol characterized by a relatively high proportion of large oligomers containing at least three intercondensed rings and by a high average molecular weight, for example, but non-limitingly, greater than or equal to 500. This resol is obtained by increasing the duration and/or temperature of the reaction between phenol and formaldehyde compared with conventional resol resins, thereby increasing the degree of condensation, and ensuring almost quantitative conversion of the initial phenol. Such supercondensed resol resins have reacted beyond the stage of monocondensation into monomethylolphenols, and therefore contain a very low proportion of free phenol and other volatile phenolic compounds which can pollute the atmosphere where the insulation product is manufactured or used. Supercondensed resols modified by urea are described in International Application WO-A-99/03906 filed on Jul. 9, 1998 and published on Jan. 28, 1999.

Typically, a the supercondensed resol of the present invention is obtained by the base catalyzed condensation of phenol and formaldehyde to form a product having a water dilutability at 20° C. and pH 9 of less than or equal to 2000%, for a reaction mixture whose solids content is particularly about 30 to 60% by weight.

The invention may advantageously use highly condensed resols, having a dilutability at 20° C. and pH 9 of less than or equal to 1900%, particularly 1500%, or even 1000%, especially about 400 to 900%. These resols may have a free phenol content of less than or equal to 0.5%, and even 0.3% or less.

Supercondensed resols may be characterized by neutralizing a portion of the reaction mixture with sulphuric acid (neutralization means the adding sufficient $H_2SO_4$ to protonate all the phenoxide groups produced by the basic catalyst). The dilutability of the neutralized supercondensed resol mixture can be very low, especially less than 1000%, particularly less than 500%, or even zero. As soon as the pH of a supercondensed resol solution reaches a value of about 8 to 8.5, precipitation may be observed.

It may be advantageous to limit the amount of formaldehyde when preparing supercondensed resols, by choosing a relatively low formaldehyde/phenol molar ratio of about 2 to 5, especially 2 to 4 and particularly 2.2 to 3.6. The basic catalyst, for example, sodium hydroxide, is generally used in an amount corresponding to 6 to 20 mol of hydroxide equivalents per 100 mol of initial phenol.

The supercondensed resol may advantageously be prepared by continuing the reaction until a degree of phenol conversion greater than or equal to 98%, preferably greater than or equal to 99% and most particularly about at least 99.3% to 99.5% is obtained. This corresponds to continuing the condensation reaction until the product has a dilutability in water at 20° C. and pH 9 of less than or equal to 2000%, especially 1500% or even 1000%.

In a first variant of the condensation reaction, the monomers are brought into contact with a basic polymerization catalyst, preferably at a temperature of between approximately 20 and 60° C., and then heated to a reaction temperature of between approximately 50 and 80° C., preferably approximately 70° C., until the desired degree of conversion is reached. Advantageously, this reaction temperature is maintained for 100 to 200 minutes, preferably approximately 120 to 160 minutes. This prolonged heating allows the supercondensation of the resin to be achieved with the formation of high-molecular-weight species containing a greater proportion of large oligomers containing three or more intercondensed phenolic rings. Next, the mixture is cooled to a temperature of 20 to 30° C.

In a second variant of the condensation reaction, the monomers are brought into contact with a basic polymerization catalyst, preferably at a temperature of between approximately 20 and 60° C. and then they are heated to a first reaction temperature between approximately 50 and 80° C., preferably approximately 70° C., and then the temperature of the mixture is raised to a second reaction temperature of between 70 and 90° C., preferably 85° C., until the desired degree of conversion is obtained. This second heating plateau is intended to supercondense the resin with the formation of high-molecular-weight species containing a greater proportion of large oligomers containing three or more intercondensed phenolic rings.

Advantageously, the duration of the reaction at the first temperature is 50 to 80 minutes and the duration of the reaction at the second temperature is 30 to 60 minutes. Next, the mixture is cooled to a temperature of 20 to 30° C.

The pH of the resulting resol thus obtained is generally about 8.5 to 10, especially 9 to 9.5. The resol may be neutralized in order to terminate the condensation reaction and thereby preserve the dilutability of the resin.

In a first variant, the resin according to the present invention comprises an unneutralized resol from which the sizing resin and the insulation product according to the invention may be prepared. Because emissions of volatile organic compounds are limited by the high degree of condensation, the basic catalyst need not be rapidly deactivated. The pH of such a resol is generally about 8.5 to 10. These resols are storage stable. In order to manufacture the sizing composition, such resol resins may be mixed with the other necessary ingredients.

A neutralization reagent may be included among these ingredients, since it is desirable to prevent dissociation of the monomers during passage of the sizing composition and/or insulation product through an oven. This neutralization reagent is preferably one or more of boric acid or an equivalent borate, sulphamic acid or an equivalent sulphamate, an amine acid or a system comprising an emulsifier and an acid.

When it is desired that the phenol-formaldehyde resol be sprayed in the unneutralized state, particularly a resol with a dilutability at 20° C. and pH 9 of about 1000 to 2000%, or even less, but more generally from approximately 1500 to 2000%, a neutralization reagent not limited to the reagents just described above may be added at the spraying stage, in the form of a jet of aqueous solution or dispersion sprayed at the sizing ring.

Alternatively, the resol may be mixed with an acid-precursor neutralizing reagent. The acid-precursor neutralizing agent neutralizes the resol in a delayed manner, for example, after thermal activation. Thus, for example, the addition of ammonium sulphate or aluminum sulphate to the resol at room temperature does not modify the pH of the resol, but generates sulphuric acid at high temperature. The amount of ammonium sulphate added to the resol is such that enough $H_2SO_4$ equivalents are produced after heating to neutralize the basic catalyst remaining in the resol.

The acid-precursor neutralizing reagent as described above, may also be added at the ring for spraying the sizing composition. The thermal activation of the acid-precursor neutralizing reagent may occur, for example, when the sizing composition is applied to the hot filaments of mineral material or when the mineral wool sheet passes through an oven.

In a second variant, the sizing resin according to the present invention comprises a supercondensed resol neutralized with boric acid or an equivalent borate, especially ammonium borate, sodium metaborate, sodium tetraborate, a polyborate of an aminoalcohol, etc., with sulphamic acid or an equivalent sulphamate, or with an amine acid, especially aspartic acid, etc. These acids have the property of modifying the resol in such a way that its dilutability is higher in the neutralized medium thus obtained than in the medium obtain with sulphuric acid. The product of the neutralization of a supercondensed resol by boric acid generally has a dilutability at 20° C. of at least 1000%, and very often about 2000% or more. Advantageously, the neutralization is carried out until an approximately neutral resin composition, with a pH of about 7 to 8, is obtained.

The neutralization of the resol may also be carried out with boric acid in alkaline solution, especially an ammoniacal solution. Such resin compositions are basic, with a pH of, for example, about 8 to 10, especially 8.5 to 10. The highly condensed resol modified by boric acid is stable in a basic medium.

In another variant, the supercondensed resol is neutralized with any acid, but it also contains an emulsifier such as a gum and/or an anionic surfactant, especially guar and ghatti gums, or possibly casein. Preferably, the resol neutralization product is obtained in the presence of the emulsifier. The latter may be used in an amount of 1 to 10 parts by weight of emulsifier per 100 parts by weight of dry matter in the resol. The acid used may be chosen from any known strong acid, such as sulphuric acid or hydrochloric acid, but also boric acid, sulphamic acid or a sulphamate. Advantageously, the neutralization is carried out until an emulsion having a pH of about 7 to 8, especially 7.2 to 7.6, is obtained.

The variants mentioned above are not mutually exclusive, and it is entirely possible to combine them. For example, a supercondensed resin may be treated with a bisulphite or with an amine capable of undergoing the Mannich reaction.

Apart from the resin described above, the sizing composition used in the manufacture of the insulation product according to the invention may include the usual additives, namely, per 100 parts by weight of resin solids:

| | |
|---|---|
| ammonium sulphate | 0 to 5, especially about 2 to 3 |
| silane, especially aminosilane | 0 to 2 |
| mineral oil | 0 to 20 |
| 20% aqueous ammonia solution | 0 to 25, especially 0 to 20 or 0 to 18 |

Ammonium sulphate generally does not act as a source of isocyanates, because of the evaporation of ammonia gas after passage of the freshly sized insulation products through the oven. The ammonia solution used in the amounts specified above does not generally act as a source of isocyanates, or does so only slightly. Any emissions are very small because of at least partial evaporation of ammonia gas in the oven.

The insulation products according to the invention advantageously contain about 2 to 20% by weight of solids derived from the sizing composition, especially 3 to 10%, preferably about 4 to 8%. In addition, the amount of solids derived from the sizing composition may be 3, 4, 5, 6, 7, 8, 9, 10, 11, 12, 13, 14, 15, 16, 17, 18, and 19% by weight, inclusive of all values and subranges therebetween.

The insulation products according to the present invention may have all of the usual forms, in particular a rolled felt or blanket, rigid or flexible panel, felt, in particular a felt or panel intended for use in a mass-produced thermal appliance, such as a stove or oven. The density of these products may vary from about 10 to 80 kg/m³, including 15, 20, 25, 30, 35, 40, 45, 50, 55, 60, 65, 70, and 75 kg/m³, inclusive of all values and subranges therebetween.

The low levels of isocyanate emissions produced by insulation products according to the present invention may be determined by measuring the amount of methyl isocyanate evolved when the product is heated to a temperature of approximately 350° C. for 20 minutes. Generally, the amount of isocyanate emissions is less than or equal to 150 mg of methyl isocyanate per kg of insulation product.

The present invention is also directed to a method of preparing an insulation product employing a sizing composition based on a phenol-formaldehyde resin, substantially free of urea. The insulating product is preferably a thermal or acoustic insulation product based on mineral wool, more preferably glass wool or rock wool, for the purpose of reducing the emissions of isocyanates from the insulation product. The sizing composition is used under the conventional conditions employed in the manufacture of insulation products. For example, the sizing composition may be sprayed onto the mineral wool.

Further advantages and features of the invention will be apparent from the following non-limiting examples.

PRELIMINARY TESTS: EFFECTS OF VARIOUS NITROGEN COMPOUNDS ON ISOCYANATE EMISSION LEVELS

Various nitrogen containing compounds were evaluated to determine their effect on the emission of isocyanates from insulation products. The compounds tested were: urea, ammonia solution, diethanolamine and ammonium sulphate, which are all ingredients described in the prior art as components of sizing compositions for insulation products.

The sizing compositions were prepared from a phenol-formaldehyde resin according to the following formulae, indicated in Table 1. The resin is the same for specimens A to D and F to H, the resin of specimen E being distinguished therefrom only by being treated with diethanolamine (DEA). Identical amounts of the sizing compositions were sprayed onto identical mineral wool specimens.

A 1 gram sample of each specimen was heated for 20 minutes in a tube furnace at 350° C. with a 2 l/min flow of air. The amount of methyl isocyanate (MIC) entrained in the air flow was measured at the outlet of the furnace in accordance with the OSHA No. 54 standard (MIC scavenging by means of a solid trap impregnated with an MIC-scavenging reagent, then in a guard bubbler containing the same reagent and finally assay by HPLC using UV fluorescence detection).

This test is intentionally very severe, and does not reflect the level of emissions expected to occur under normal use conditions, but it does provide a very clear demonstration of the effects of the compounds tested on isocyanate emissions.

Based on the isocyanate levels measured for the control specimen A, containing no nitrogen compound, and given the level of uncertainty in the measurement method employed, it may be concluded from the data of Table 1 that ammonium sulphate and diethanolamine are not significant sources of isocyanate, while only minute isocyanate emissions are observed for sizing compositions employing the ammonia solution.

It was also found that the urea in specimen F generates approximately three times more isocyanate than specimen D which employs an ammonia solution, even though both formulae contain approximately equal amounts of nitrogen compound (assuming that the emission specific to $NH_3$ is 6 mg/kg since the emission due to ammonium sulphate is measured at 5 mg/kg in specimen B).

TABLE 1

| | Size Proportions in parts by weight of dry matter | | | | |
|---|---|---|---|---|---|
| Specimen | Resin | Urea | Catalyst | Ammonia solution | MIC emission (mg/kg) |
| A | 100 | 0 | 0 | 0 | 3 |
| B | 100 | 0 | $(NH_4)_2SO_4$: 3 | 0 | 5 |
| C | 100 | 0 | $H_3BO_3$ | 0 | 4 |
| D | 100 | 0 | $(NH_4)_2SO_4$: 3 | 6 | 11 |
| E | 100 including 6.8 DEA | 0 | 0 | 0 | 6 |
| F | 95 | 5 | 0 | 0 | 18 |
| G | 90 | 10 | 0 | 0 | 24 |
| H | 85 | 15 | 0 | 0 | 80 |

In addition, the data of Table 1 show that the amount of isocyanate emitted increases directly with the proportion of urea in the sizing composition. Eliminating urea from the sizing composition therefore reduces the emission of methyl isocyanate to a very low level.

The following laboratory test demonstrates the effect of urea on pollutant emissions from the sizing operation during the manufacture of insulating product. A sizing composition I was prepared with 55 parts by weight of the resin used previously per 45 parts by weight of urea. The emissions of sizing compositions I and D were then compared as follows:

3.76 g of the sizing composition was diluted to 26.6% solids content in a 1-liter Erlenmeyer flask, so as to coat the bottom of the container;

the Erlenmeyer flask was placed in a fan-assisted oven set at 180° C.;

recovering in bubblers and analyzing, over a one hour period, the gases emitted, (phenol, formaldehyde and ammonia).

The results of the analyses, expressed in g of gas emitted per kg of sizing composition, are given in Table 2 below. Again, the amount of gases emitted do not reflect the actual emissions on an insulation-product manufacturing line but would be expected to correlate with levels observed under actual manufacturing conditions.

TABLE 2

| | Size Proportions in parts by weight of dry matter | | | Emission of pollutants (g/kg of sizing composition) | | |
|---|---|---|---|---|---|---|
| Test | Resin | Urea | Ammonium sulphate | Ammonia solution | Phenol | Formaldehyde | Ammonia gas |
| D | 100 | 0 | 3 | 6 | 14.0 | 97.3 | 2 |
| I | 55 | 45 | 3 | 6 | 7.7 | 3.3 | 34.8 |

A comparison of the pollutant emissions observed for these two sizing compositions very clearly shows that urea is a source of considerable emission of ammonia gas, which is already a problem on the manufacturing line, and also suggests that other nitrogen derivatives may be produced when the final insulation product is subjected to higher temperature conditions.

The higher amount of phenol and formaldehyde emitted in composition D is the result of the approximately two-fold higher amount of resin in composition D relative to composition I. However, eliminating urea in composition D is somewhat problematic since composition D has no formaldehyde scavenger. Solutions to this problem will be presented in the examples below.

COMPARATIVE EXAMPLE

This example illustrates the process for manufacturing an insulation product according to the prior art, with a urea-modified phenol-formaldehyde resin.

a) Preparation of the Resin

Phenol and 37% aqueous formaldehyde (formaldehyde/phenol molecular ratio of 3.35) were introduced into a stirred reactor heated to 45° C. A sodium hydroxide catalyst, (NaOH/phenol molar ratio of 5%) was then added slowly while maintaining the reaction at 45° C. After adding the sodium hydroxide, the temperature of the mixture was increased to 70° C. over 30 minutes and stirring was continued at this temperature for 80 minutes. The mixture was then cooled. When the temperature of the reaction mixture reached approximately 25° C., a 20% sulphuric acid solution was added so as to obtain a pH of approximately 7.2.

The resin thus obtained had a solids content of approximately 37%, a free phenol content of 0.5% and a free formaldehyde content of 6.6% with respect to the weight of liquid resin. The formaldehyde content was reduced by using urea as formaldehyde scavenger when formulating the sizing composition.

| resin | 55 |
| urea | 45 |
| ammonium sulphate | 2 to 3 |
| mineral oil | 0 to 20 |
| silane | 0.5 to 2 |
| 20% aqueous ammonia solution | 6 | c) Method of Manufacturing an Insulation Product

The above sizing composition was sprayed onto glass wool leaving a conventional centrifugal-drawing mineral-wool manufacturing device, between the centrifugal device and the collector. The amount of sizing composition adhering to the glass wool was approximately 7% solids with respect to the weight of glass. After collecting the sized wool on the collector, a blanket was formed which was then passed through an oven at a temperature of between 180 and 200° C. in order to crosslink the phenol-formaldehyde resin.

The glass blanket thus manufactured, had a density of approximately 20 kg/m$^3$ and a thickness of approximately 30 mm, and is therefore suitable for use in a mass-produced thermal appliance such as a stove or oven.

The cumulative emissions of pollutants were measured throughout the manufacturing line, particularly at the device for collecting the sized wool and at the oven, by taking atmospheric samples at these locations by means of bubblers. The phenol content of the samples were measured by gas chromatography. The total phenol (i.e., all volatile phenol derivatives), formaldehyde and ammonia-solution content was measured by calorimetry and the content of volatile organic compounds was measured by means of a TOC meter.

Samples of the insulation product were also obtained and subjected to the same heat treatment as in the preliminary tests, above, and the amount of methyl isocyanate generated by the product was also measured. The results are expressed in mg of methyl isocyanate per kg of insulation product.

EXAMPLE 1

This example illustrates a method of manufacturing an insulation product, first using a phenol-formaldehyde resin containing no urea.

a) Preparation of the Resin

Phenol and 37% aqueous formaldehyde (formaldehyde/phenol molecular ratio of 2.5) were introduced into a stirred reactor heated to 45° C. Sodium hydroxide catalyst (NaOH/phenol molar ratio of 5%) was then added slowly to the reactor, while maintaining the temperature at 45° C. After adding the sodium hydroxide, the temperature of the mixture was increased to 70° C. over 30 minutes and the stirring was continued at this temperature for 80 minutes. The mixture was then steadily cooled and diethanolamine (total amount of diethanolamine was 32.6% by weight with respect to the weight of phenol) was gradually added over the first 30 minutes. After the amine was added, the temperature was approximately 60° C. and remained at about this value for about fifteen minutes (i.e., the reaction is exothermic). The mixture was then cooled. When the temperature of the reaction mixture reached approximately 25° C., a 25% sulphuric acid solution was then added in order to obtain a pH of approximately 7.2.

The resulting resin had a solids content of 43.6%, a free phenol content of 0.47% and a free formaldehyde content of 1.76% with respect to the weight of liquid resin. The amount of free formaldehyde was further reduced by using ammonium bisulphite as a formaldehyde scavenger in the sizing composition.

b) Formulation of the Sizing Composition

A sizing composition was prepared which had the following composition (in parts by weight of dry matter):

| resin | 100 |
| ammonium bisulphite | 5 |
| ammonium sulphate | 2 to 3 |
| mineral oil | 0 to 20 |
| silane | 0.5 to 2 |
| 20% aqueous ammonia solution | 6 |
| urea | 0 | c) This sizing composition was used to manufacture an insulation product in the same way as in the comparative example above and it was subjected to the same pollutant-emission measurements. The cumulative results of the measurements at each point on the manufacturing line, expressed in kg of pollutant per tonne of glass, are given in Table 3 below. The modifications made to the sizing composition did not degrade its properties as an insulating material in a mass-produced thermal appliance.

These results show that, compared with the conventional product, the total phenol emissions observed during the manufacturing process are a little higher, but the emissions of the other organic compounds, namely formaldehyde and ammonia gas are lower. More importantly, the insulation product according to the present invention emits more than 30 times less methyl isocyanate than a conventional product. Such emission levels in the insulation product of the present invention are low enough to guarantee the safety of those using the product.

EXAMPLE 2

This example illustrates the process for manufacturing an insulation product using a second phenol-formaldehyde resin containing no urea.

a) Preparation of the Resin

A phenol-formaldehyde resin was prepared as in Example 1, but the phenol and formaldehyde (formaldehyde/phenol molar ratio of about 2.8) were reacted in the presence of catalytic sodium hydroxide having a NaOH/phenol molar ratio of 6%.

After adding the sodium hydroxide, the temperature of the mixture was increased to 70° C. over 30 minutes and stirring was continued at this temperature for 120 minutes. The mixture was then cooled, and when the temperature of the reaction mixture reached approximately 25° C., sulphamic acid was added so as to obtain a pH of approximately 7.2.

The resin thus obtained had a solids content of 37.2%, a free phenol content of 0.7% and a free formaldehyde content of 2.6% with respect to the weight of liquid resin. The free formaldehyde content was reduced further by using ammonium bisulphite as formaldehyde scavenger in the formulation of the sizing composition.

b) Formulation of the Sizing Composition

The composition is as follows (in parts by weight of dry matter):

| | |
|---|---|
| resin | 100 |
| ammonium bisulphite | 5 |
| ammonium sulphate | 2 to 3 |
| mineral oil | 0 to 20 |
| silane | 0.5 to 2 |
| 20% aqueous ammonia solution | 18 |
| urea | 0 | c) This sizing composition was used to manufacture an insulation product according to the same method used in the comparative example, above, and was subjected to the same pollutant-emission measurements. The results, expressed in kg of pollutant per tonne of glass, are given in Table 3 below.

These results show that, compared to a conventional product, the total phenol emissions during the manufacturing process of the insulation product of the present invention are of the same order of magnitude as the conventional product, whereas the formaldehyde and ammonia gas emissions during the manufacturing process are considerably reduced. In addition, the insulation product according to the present invention emits appreciably less methyl isocyanate than a conventional product. Such emission levels in the insulation product of the present invention are low enough to guarantee the safety of those using the product.

The modifications made to the sizing composition did not degrade its properties as an insulating material in a mass-produced thermal appliance.

EXAMPLE 3

The insulation product was prepared according to the method of Example 2, except that approximately 5% by weight of the sizing composition was applied to the glass wool, with respect to the weight of glass. Thus by slightly reducing the amount of binder in the product, the emission levels of pollutants was very markedly reduced and the insulation product remained fully suitable for use in a mass-produced thermal appliance. In particular, its mechanical properties were essentially unaffected.

What is claimed as new and is intended to be secured by Letters Patent is:

1. An insulation product comprising:
   a mineral wool, and
   a sizing composition comprising phenol-formaldehyde resin,
   wherein said phenol-formaldehyde resin is substantially free of urea or of a urea derivative.

2. An insulation product comprising:
   a mineral wool, and
   a sizing composition comprising a phenol-formaldehyde resin, wherein said phenol-formaldehyde rein is substantially free of urea or of a urea derivative, and wherein said phenol-formaldehyde resin comprises a resol treated with at least one formaldehyde-scavenging reactant selected from the group consisting of a water-soluble sulphite, a water soluble bisulphite, and an amine capable of reacting with an aldehyde by a Mannich reaction mechanism.

3. An insulation product comprising:
   a mineral wool, and
   a sizing composition comprising a phenol-formaldehyde resin, wherein said phenol-formaldehyde rein is substantially free of urea or of a urea derivative, and wherein said phenol-formaldehyde resin comprises a supercondensed resol, or a neutralized supercondensed resol.

4. An insulation product comprising:
   a mineral wool, and
   a sizing composition comprising a phenol-formaldehyde resin, wherein said phenol-formaldehyde rein is substantially free of urea or of a urea derivative, which is an insulation felt for a mass-produced thermal appliance.

5. A sizing composition for an insulation product based on mineral wool comprising: a phenol-formaldehyde resin which is substantially free of urea or of a urea derivative, and wherein said phenol-formaldehyde resin comprises a resol treated with at least one formaldehyde-scavenging reactant selected from the group consisting of a water-soluble sulphite, a water soluble bisulphite, and an amine capable of reacting with an aldehyde by a Mannich reaction mechanism.

6. A sizing composition for an insulation product based on mineral wool comprising: a phenol-formaldehyde resin which is substantially free of urea or of a urea derivative, and wherein said phenol-formaldehyde resin is a supercondensed resol or a neutralized supercondensed resol.

7. The insulation product of claim 1, wherein said mineral wool is at least one wool selected from the group consisting of glass wool and rock wool.

TABLE 3

| | On-line emissions | | | Emission by the |
|---|---|---|---|---|
| Example | Total phenol (kg/t of glass) | Formaldehyde (kg/t of glass) | Ammonia gas (kg/t of glass) | product MIC (mg/kg) |
| Comparative 1 | 2.2 | 2.4 | 3.4 | 881 |
| 1 | 3.1 | 0.9 | 1.7 | <30 |
| 2 | 2.5 | 0.6 | 2.1 | <117 |
| 3 | 1.7 | 0.5 | 1.4 | n.d |

French patent application 99/00510, filed Jan. 19, 1999, is incorporated herein by reference.

Obviously, numerous modifications and variations on the present invention are possible in light of the above teachings. It is therefore to be understood that within the scope of the appended claims, the invention may be practiced otherwise than as specifically described herein.

8. The insulation product of claim 1, further comprising at most 0.004% by weight of urea or urea derivative.

9. The insulation product of claim 1, further comprising at most 0.2% by weight of an ammonia solution.

10. The insulation product of claim 9, wherein said sizing composition is substantially free of ammonia solution.

11. The insulation product of claim 1, wherein said phenol-formaldehyde resin is prepared by condensing phenol and formaldehyde at a formaldehyde/phenol molar ratio of about 2 to 6.

12. The insulation product of claim 2, wherein said sulphite is at least one sulphite selected from the group consisting of a sulphite of an alkali metal, a sulphite of an alkaline earth metal, and an ammonium sulphite.

13. The insulation product of claim 2, wherein said bisulphite is at least one bisulphite selected from the group consisting of a bisulphite of an alkali metal, a bisulphite of an alkaline-earth metal, an ammonium bisulphite, and a bisulphite precursor.

14. The insulation product of claim 2, wherein the amine capable of reacting with an aldehyde by a Mannich reaction mechanism is selected from the group consisting of monoethanolamine, diethanolamine, an amine acid, aspartic acid, a cyclic amine, piperidine, and piperazine.

15. The insulation product of claim 13, wherein said bisulphite precursor is a metabisulphite and/or a mixture of a sulphite and an acidifying agent.

16. The insulation product of claim 2, wherein said resol is prepared by condensing formaldehyde and phenol in a formaldehyde/phenol molar ratio of about 2 to 6.

17. The insulation product of claim 2, wherein said resol is prepared by condensing formaldehyde and phenol in a formaldehyde/phenol molar ratio of 2.2 to 4.

18. The insulation product of claim 3, wherein said neutralized supercondensed resol is a supercondensed resol neutralized with at least one acid selected from the group consisting of boric acid, sulphamic acid and aspartic acid.

19. The insulation product of claim 3, wherein said supercondensed resol is prepared by condensing formaldehyde and phenol in a formaldehyde/phenol molar ratio of about 2 to 5.

20. The insulation product of claim 3, wherein said supercondensed resol is prepared by condensing formaldehyde and phenol in a formaldehyde/phenol molar ratio of 2.2 to 3.6.

21. The insulation product of claim 1, wherein said insulation product generates less than or equal to 150 mg of methyl isocyanate per kg of insulation product when said insulation product is heated at a temperature of approximately 350° C. for 20 minutes.

22. A sizing composition for an insulation product based on mineral wool comprising:

phenol-formaldehyde resin which is substantially free of urea or of a urea derivative.

23. The sizing composition of claim 22, further comprising at most 0.1 parts by weight of urea or of urea derivative per 100 parts by weight of dry resin.

24. The sizing composition of claim 22, further comprising at most 25 parts by weight of a 20% aqueous ammonia solution per 100 parts by weight of dry resin.

25. The sizing composition of claim 22, wherein said phenol-formaldehyde resin is prepared by condensing phenol and formaldehyde at a formaldehyde/phenol molar ratio of about 2 to 6.

26. The sizing composition of claim 5, wherein said sulphite is at least one sulphite selected from the group consisting of a sulphide of an alkali metal, a sulphite of an alkaline earth metal, and an ammonium sulphite.

27. The sizing composition of claim 5, wherein said bisulphite is at least one bisulphite selected from the group consisting of a bisulphite of an alkali metal, a bisulphite of an alkaline-earth metal, an ammonium bisulphite, and a bisulphite precursor.

28. The sizing composition of claim 5, wherein the amine capable of reacting with an aldehyde by a Mannich reaction mechanism is selected from the group consisting of monoethanolamine, diethanolamine, an amine acid, aspartic acid, a cyclic amine, piperidine, and piperazine.

29. The sizing composition of claim 27, wherein said bisulphite precursor is a metabisulphite and/or a mixture of a sulphite and an acidifying agent.

30. The sizing composition of claim 5, wherein said resol is prepared by condensing formaldehyde and phenol in a formaldehyde/phenol molar ratio of about 2 to 6.

31. The sizing composition of claim 5, wherein said resol is prepared by condensing formaldehyde and phenol in a formaldehyde/phenol molar ratio of 2.2 to 4.

32. The sizing composition of claim 6, wherein said neutralized supercondensed resol is a supercondensed resol neutralized with at least one acid selected from the group consisting of boric acid, sulphamic acid and aspartic acid.

33. The sizing composition of claim 6, wherein said supercondensed resol is prepared by condensing formaldehyde and phenol in a formaldehyde/phenol molar ratio of about 2 to 5.

34. The sizing composition of claim 6, wherein said supercondensed resol is prepared by condensing formaldehyde and phenol in a formaldehyde/phenol molar ratio of about 2.2 to 3.6.

35. A process for manufacturing an insulation product comprising:

preparing a mineral wool, depositing the sizing composition of claim 22 on said mineral wool, and forming a sheet of said sized mineral wool.

36. The insulation product of claim 1, further comprising no urea or urea derivative.

37. The insulation product of claim 1, further comprising at most 0.002% by weight of urea or urea derivative.

38. The insulation product of claim 1, further comprising less than 0.1 % by weight of ammonia solution.

39. The insulation product of claim 1, further comprising less than 0.01% by weight of ammonia solution.

40. The sizing composition of claim 22, further comprising 18 to 20 parts by weight or less of a 20% aqueous ammonia solution per 100 parts by weight of dry resin.

* * * * *